(12) United States Patent  (10) Patent No.: US 8,405,753 B2
Wakabayashi et al.  (45) Date of Patent: Mar. 26, 2013

(54) ELECTRONIC DEVICE AND ELECTRONIC CAMERA

(75) Inventors: Tsutomu Wakabayashi, Yokohama (JP); Kosho Miura, Kamakura (JP); Koichiro Kawamura, Ichihara (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/067,752

(22) Filed: Jun. 23, 2011

(65) Prior Publication Data

US 2011/0254990 A1 Oct. 20, 2011

Related U.S. Application Data

(63) Continuation of application No. 10/352,207, filed on Jan. 28, 2003, now abandoned.

(30) Foreign Application Priority Data

Jan. 30, 2002 (JP) ................................. 2002-021410
Jan. 23, 2003 (JP) ................................. 2003-014433

(51) Int. Cl.
*H04N 5/222* (2006.01)
(52) U.S. Cl. ................................. 348/333.02; 348/231.1
(58) Field of Classification Search ............... 348/231.1, 348/333.02
See application file for complete search history.

(56) References Cited

U.S. PATENT DOCUMENTS

| 6,249,313 B1 | 6/2001 | Nishi |
| 6,469,738 B1 * | 10/2002 | Hayashi .................... 348/231.99 |
| 6,670,992 B2 | 12/2003 | Irie |
| 2001/0000969 A1 * | 5/2001 | Ohta et al. .................... 348/231 |
| 2001/0016113 A1 | 8/2001 | Ejima et al. |
| 2002/0012051 A1 | 1/2002 | Mizoguchi |
| 2002/0030754 A1 | 3/2002 | Sugimoto |
| 2002/0171747 A1 * | 11/2002 | Niikawa et al. .......... 348/333.01 |
| 2007/0214471 A1 | 9/2007 | Rosenberg |

FOREIGN PATENT DOCUMENTS

| JP | 53-036337 | 10/1978 |
| JP | A-54-35672 | 3/1979 |
| JP | A-57-100534 | 6/1982 |
| JP | U-1-130186 | 9/1989 |
| JP | U-1-133191 | 9/1989 |
| JP | A-7-134629 | 5/1995 |
| JP | U-7-26653 | 5/1995 |
| JP | A-8-235122 | 9/1996 |
| JP | A-2000-056894 | 2/2000 |
| JP | A-2000-075810 | 3/2000 |
| JP | 2001-311641 | 11/2001 |

OTHER PUBLICATIONS

Office Action issued in JP Application No. 2003-014433 on Mar. 16, 2010.
education.ti.com/guidebooks/graphing/86/86bookeng.pdf (Manual of the TI-86 Graphing Calculator).

* cited by examiner

*Primary Examiner* — Anthony J Daniels
(74) *Attorney, Agent, or Firm* — Oliff & Berridge, PLC

(57) ABSTRACT

An electronic device includes: a display element that displays a numeral; an auxiliary display element that displays an expression other than a numeral; an arithmetic operation device that executes an arithmetic operation to obtain an integer; and a display control device that implements control so as to display the integer obtained through the arithmetic operation executed by the arithmetic operation device by using the display element and the auxiliary display element.

28 Claims, 9 Drawing Sheets

ELECTRONIC DEVICE AND ELECTRONIC CAMERA

This is a Continuation of application Ser. No. 10/352,207 filed Jan. 28, 2003. The disclosure of the prior application is hereby incorporated by reference herein in its entirety.

INFORMATION BY REFERENCE

The disclosures of the following priority applications are herein incorporated by reference:
Japanese Patent Application No. 2002-021410 filed Jan. 30, 2002
Japanese Patent Application No. 2003-014433 filed Jan. 23, 2003

BACKGROUND OF THE INVENTION

1. Field of the Invention

The present invention relates to an electronic device and an electronic camera that display a numerical value.

2. Description of the Related Art

There are electronic devices in the known art that display a numerical value that changes by an increment of 1 at a time as in the display of the number of frames at an electronic camera. When a memory card with a large recording capacity is used to record image data obtained through photographing operations executed in an electronic camera, a large number of photographic frames, sometimes in excess of 10,000 frames, must be handled in the electronic camera.

If the number of display digits at the display device is increased in order to display such a large value, the display device is bound to become large in size, which leads to an increase in the production cost of the display device and also an increase in the size of the electronic device. If the number of display digits is increased without changing the size of the display device, the display size of each digit will become extremely small and the user will have difficulty reading the displayed value.

SUMMARY OF THE INVENTION

The present invention provides an electronic device and an electronic camera that display a large value that can be read easily.

An electronic device according to the present invention comprises: a display element that displays a numeral; an auxiliary display element that displays an expression other than a numeral; an arithmetic operation device that executes an arithmetic operation to obtain an integer; and a display control device that implements control so as to display the integer obtained through the arithmetic operation executed by the arithmetic operation device by using the display element and the auxiliary display element.

In this electronic device, it is preferred that an operating member is further provided and the arithmetic operation device executes an arithmetic operation to obtain an integer which changes by 1 in response to an operation of the operating member.

Also, it is preferred that the auxiliary display element displays a mark representing a predetermined number of digits. In this case, it is preferred that the auxiliary display element displays an alphabet letter K to indicate thousands. Moreover, it is preferred that a decimal point auxiliary display element that displays a decimal point, is further provided.

Also, it is preferred that: the auxiliary display element displays a decimal point; and a display of the decimal point is equivalent to a display of a mark indicating a predetermined number of digits.

Also, it is preferred that when the integer has more digits than a number of display digits in the display element, the display control device employs the auxiliary display element. In this case, it is preferred that the auxiliary display element displays information related to the number of display digits in the display element.

Also, it is preferred that: the display element displays a 3-digit numerical value; the auxiliary display element displays a mark indicating thousands; and the display control device displays the integer by using the display element alone when a number of digits in the integer does not exceed three and displays the integer by using the display element and the auxiliary display element when the number of digits in the integer is equal to or greater than four. In this case, it is preferred that a decimal point auxiliary display element that displays a decimal point is further provided, and the display control device displays the integer by using the display element, the auxiliary display element and the decimal point auxiliary display element when the number of digits in the integer is equal to or greater than four.

Also, it is preferred that the arithmetic operation device executes an arithmetic operation to obtain an integer which is affected as a setting element set at the electronic device is changed.

Another electronic device according to the present invention comprises: a display device; a setting change operation member operated to change a setting element currently set; and a display control device that controls the display device so as to display the setting element changed through an operation of the setting change operation member and display a numerical value affected by a change of the setting element when the setting element is changed.

In this electronic device, it is preferred that there are a plurality of setting elements. In this case, it is preferred that the plurality of setting elements are each related to an image recording capacity.

Also, it is preferred that: the display device includes a display element that displays a numeral and an auxiliary display element that displays an expression other than a numeral; and the display control circuit uses the display element and the auxiliary display element to display the numerical value affected by the change of the setting element.

An electronic camera according to the present invention comprises: a numeral display element that displays a numeral; an auxiliary display element that displays an expression other than a numeral; an arithmetic operation device that executes an arithmetic operation to obtain a number of remaining frames; and a display control device that implements control so as to display the number of remaining frames obtained through the arithmetic operation executed by the arithmetic operation device by using the numeral display element and the auxiliary display element.

In this electronic camera, it is preferred that: a 3-digit numerical value can be displayed at the numeral display element; a mark indicating thousands is displayed at the auxiliary display element; and the display control device implements control so as to display the number of remaining frames by using the numeral display element alone when the number of remaining frames is equal to or smaller than 999 and to display the number of remaining frames by using both the numeral display element and the auxiliary display element when the number of remaining frames is equal to or greater than 1000.

Also, it is preferred that: there is further provided a setting element display element that displays information related to a setting for at least either a number of recording pixels or an image recording quality and a setting element change device that changes the setting for at least either the number of recording pixels or the image recording quality; the arithmetic operation device recalculates through the arithmetic operation the number of remaining frames based upon the setting for at least either the number of recording pixels or the image recording quality having been changed by the setting element change device; and the display control device implements control so as to display the recalculated number of remaining frames by using the numeral display element and the auxiliary display element and display the information related to the setting for at least either the number of recording pixels or the image recording quality having been changed by the setting element change device by using the setting element display element. In this case, it is preferred that the display control device implements control so as to substantially turn off display at display elements other than the numeral display element, the auxiliary display element and the setting element display element in a display device during change processing executed by the setting element change device.

DESCRIPTION OF THE PREFERRED EMBODIMENT

The following is an explanation of an embodiment of the present invention, given in reference to the drawings.

Figure 1:
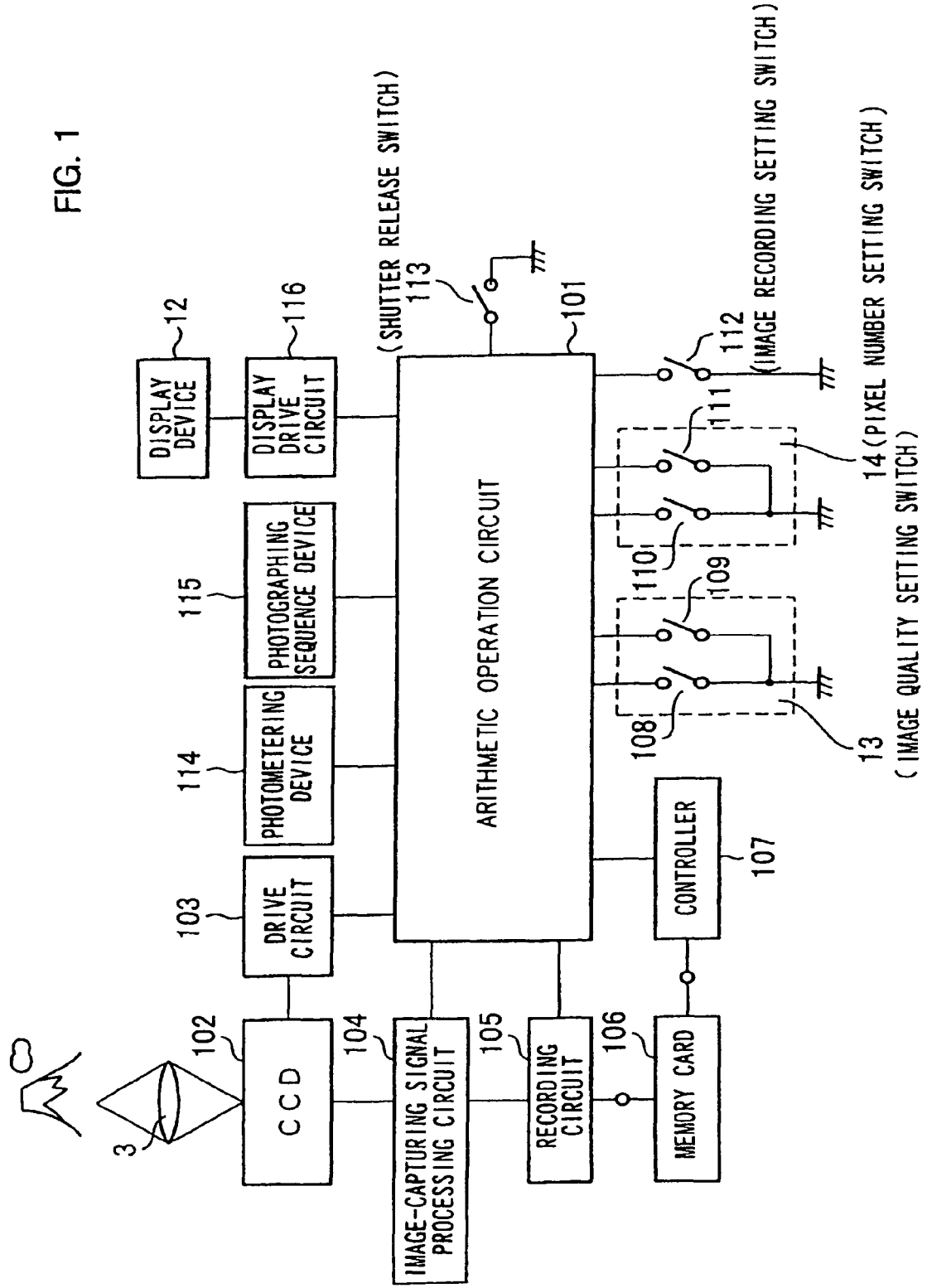
FIG. 1 is a block diagram illustrating the structure adopted in an electronic camera in an embodiment of the present invention.

FIG. 1 is a block diagram showing the structure adopted in the electronic camera in the embodiment of the present invention. An image-capturing element 102 in FIG. 1, which may be a CCD, outputs image-capturing signals by capturing a subject image having passed through a photographic lens 3. A drive circuit 103 generates a timing signal and provides a drive signal to the image-capturing element 102. The image-capturing signals output from the image-capturing element 102 are provided to an image-capturing signal processing circuit 104.

The image-capturing signal processing circuit 104 includes an A/D conversion circuit (not shown) and converts the analog image-capturing signals input from the image-capturing element 102 to digital signals. The image-capturing signal processing circuit 104 also executes image processing such as a white balance (WB) adjustment on the digital image-capturing signals, compression processing for compressing image data obtained through the image processing into a predetermined format, decompression processing for decompressing compressed data and the like. A recording circuit 105 records image data into a memory card 106 such as a flash memory. The memory card 106 is a recording medium, in which image data having undergone the image processing are recorded, that can be detachably loaded into the electronic camera. The state of the memory card 106, i.e., whether or not it is currently loaded in the electronic camera, and the recording area inside the memory card 106 are monitored and controlled by a controller 107.

A photometering device 114 detects a subject brightness level and outputs a detection signal to an arithmetic operation circuit 101. In addition to the exposure calculation executed by using the brightness detection signal, the arithmetic operation circuit 101 executes the various arithmetic operations that need to be performed in the electronic camera and implements camera operation sequence control. A photographing sequence device 115 implements control on the photographing sequence that includes moving up/down a mirror (not shown), driving an aperture (not shown) and charging a shutter (not shown) by controlling the drive of a sequence motor (not shown) in response to a command issued by the arithmetic operation circuit 101. A display device 12, which may be constituted of, for instance, a liquid crystal display, displays information indicating details of the settings selected for the electronic camera in the form of characters or icons. A display drive circuit 116 drives the display device 12 in response to a command output by the arithmetic operation circuit 101.

A shutter release switch 113, which interlocks with a shutter release button (not shown), outputs a release operation signal to the arithmetic operation circuit 101. An image recording setting switch 112 outputs an operation signal that is related to the image recording capacity when recording image data into the memory card 106, to the arithmetic operation circuit 101.

A pixel number setting switch 14 may be constituted of, for instance, dial switches 110 and 111. If the pixel number setting switch 14 is rotated while the image recording setting switch 112 is in an operated state, the pixel number setting switch 14 outputs operation signals indicating whether the number of recording pixels at which image data are to be recorded into the memory card 106 is to be increased or decreased in correspondence to the rotating operation. The switch 110 and the switch 111 respectively generate an A-phase operation signal and a B-phase operation signal in the known art. The arithmetic operation circuit 101 detects the direction along which the pixel number setting switch 14 has been rotated based upon the phase difference between the A-phase signal and the B-phase signal. The arithmetic operation circuit 101 adjusts the number of signals to be read out from the image-capturing element 102 per image plane, i.e., the number of pixels corresponding to one image, in conformance to the operation signals provided by the pixel number setting switch 14. The number of recording pixels may be set at one of the following three levels, for instance.

Pixel number 1 "L size" at which a single image plane is made up with 2048×1536 pixels Pixel number 2 "M size" at which a single image plane is made up with 1024×768 pixels Pixel number 3 "S size" at which a single image plane is made up with 640×480 pixels An image quality setting switch 13 may be constituted of, for instance, dial switches 108 and 109. If the image quality setting switch 13 is rotated while the image recording setting switch 112 is in an operated state, the image quality setting switch 13 outputs operation signals for adjusting the image recording quality at which image data are to be recorded into the memory card 106 in correspondence to the rotating operation. The switch 108 and the switch 109 respectively generate an A-phase signal and a B-phase signal in the known art. The arithmetic operation circuit 101 detects the direction along which the image quality setting switch 13 has been rotated based upon the phase difference between the A-phase signal and the B-phase signal. The arithmetic operation circuit 101 issues instructions for the image-capturing signal processing circuit 104, indicating whether or not the image processing needs to be executed and the compression rate to be set for compression processing, in conformance to the operation signal provided by the image quality setting switch 13. The image recording quality may be set at one of the following five levels, for instance.

Image quality 1 "RAW" at which the image data are recorded directly, without undergoing image processing Image quality 2 "TIFF" at which the image data having undergone image processing are recorded in an non-compressed state Image quality 3 "FINE" at which the image data having undergone image processing are recorded at a compression rate of approximately ¼

Image quality 4 "NORMAL" at which the image data having undergone image processing are recorded at a compression rate of approximately ⅛

Image quality 5 "BASIC" at which the image data having undergone image processing are recorded at a compression rate of approximately 1/16

Among displays brought at the display device 12 of the electronic camera described above, the display of the number of photographed images (the number of frames) that can be recorded constitutes a feature of the present invention. More specifically, the present invention is characterized by the display brought up to indicate a large number of frames, e.g., in excess of 1000 frames, of images that can be recorded into the memory card 106 with a large recording area. The number of frames increases or decreases as the required image recording capacity for recording image data changes, i.e., as at least either the number of recording pixels per image or the image recording quality changes.

Figure 2:
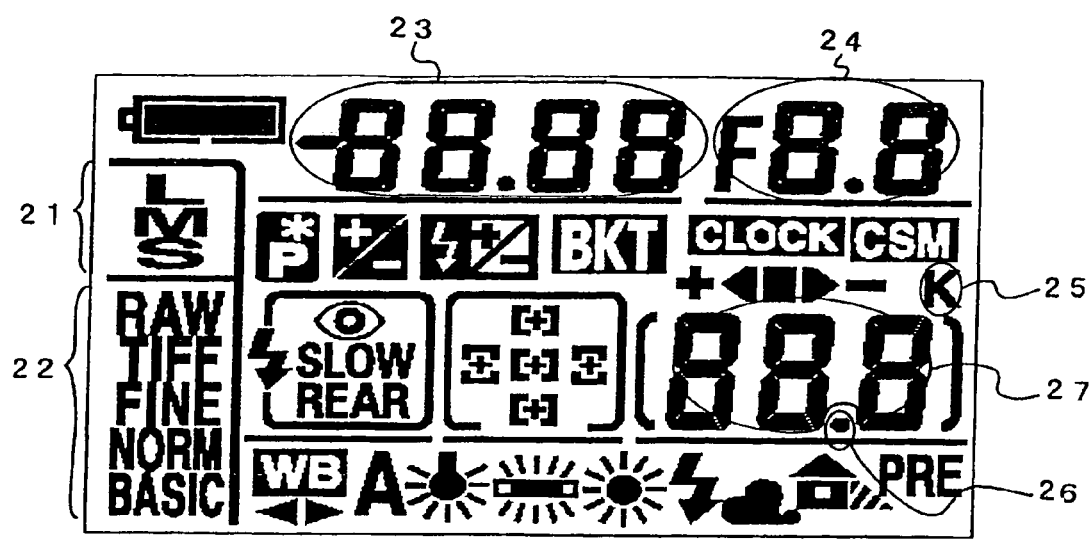
FIG. 2 illustrates the display segments at the display device.

FIG. 2 shows the display segments of the display device 12. A pixel number segment 21 is used to display the number of recording pixels. "L" is displayed in the pixel number segment 21 if the pixel number 1 mentioned earlier is selected. "M" is displayed in the pixel number segment 21 if the pixel number 2 mentioned earlier is selected. "S" is displayed in the pixel number segment 21 if the pixel number 3 mentioned earlier is selected.

An image quality segment 22 is used to display the image recording quality. "RAW" is displayed in the image quality segment 22 when the image quality 1 is selected. "TIFF" is displayed in the image quality segment 22 when the image quality 2 is selected. "FINE" is displayed in the image quality segment 22 when the image quality 3 is selected. "NORM" is displayed in the image quality segment 22 when the image quality 4 is selected. "BASIC" is displayed in the image quality segment 22 when the image quality 5 is selected A segment 23 is used to display a shutter time (shutter speed) during a photographing operation. A segment 24 is used to display the aperture value set for the photographing operation. A K display segment 25 is used to indicate a unit of 1000. A decimal point display segment 26 is used to display a decimal point. A numerical value segment 27 is used for a counter display of the number of recorded frames or the number of remaining frames. The numerical value segment 27 includes three sets of so-called 7-segment display portions used for the display of numerals and a numerical value of up to three digits can be displayed at the numerical value segment 27. In this embodiment, the K display segment 25 and the decimal point display segment 26 constitute auxiliary display segments for the numerical value segment 27. The auxiliary display segments display non-numerical characters.

While the display device 12 includes segments other than those explained above, an explanation of segments which do not constitute the feature of the present invention is omitted.

Figure 3:
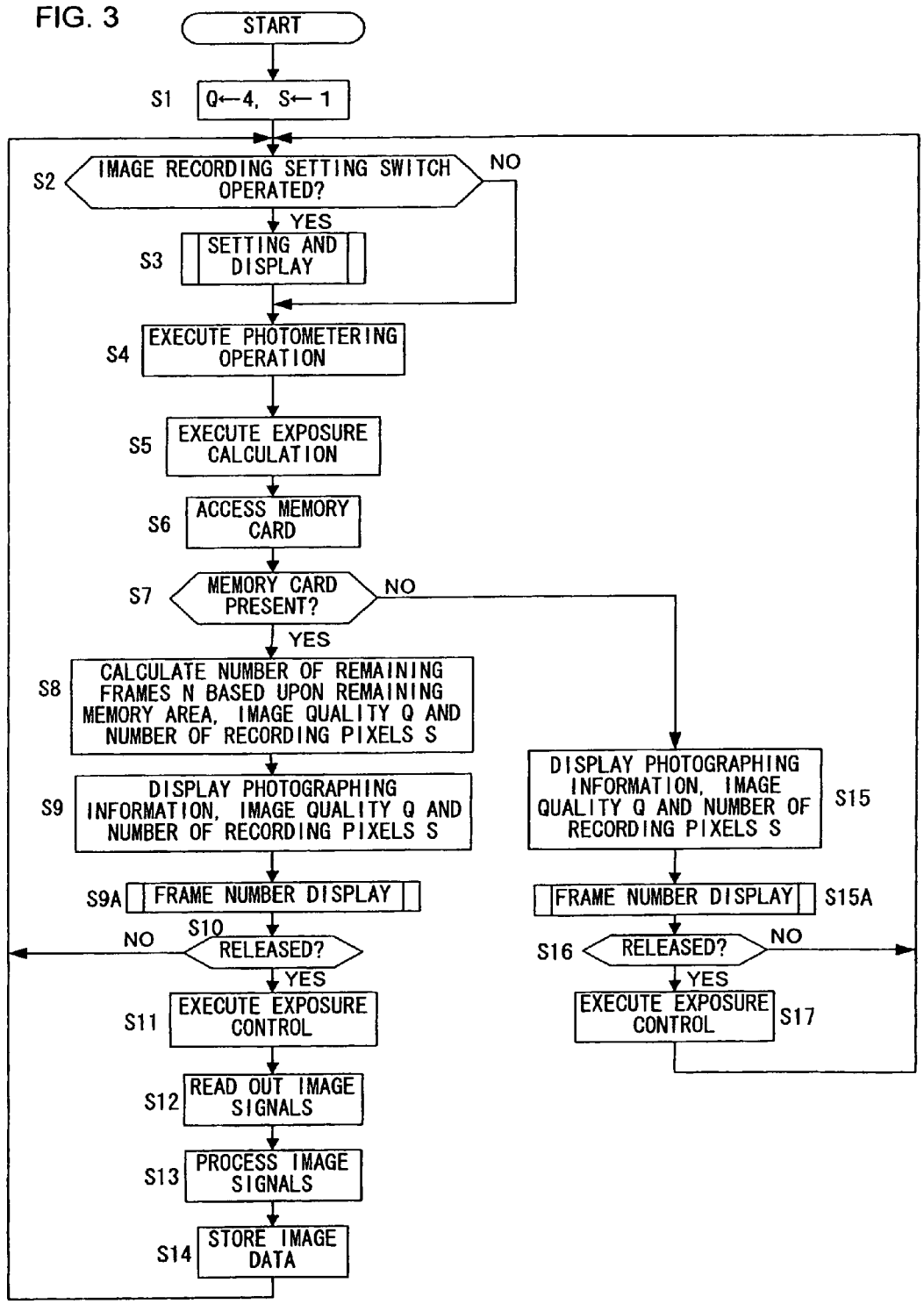
FIG. 3 presents a flowchart of the camera operation processing executed in the arithmetic operation circuit of the electronic camera.

The camera operation processing executed in the arithmetic operation circuit 101 of the electronic camera is now explained in reference to the flowchart presented in FIG. 3. The program of the processing shown in FIG. 3 is started up as batteries (not shown) are loaded into the electronic camera and is repeatedly executed subsequently. In step S1 in FIG. 3, the arithmetic operation circuit 101 performs the following initial setting operation. Namely, it sets 4 for an image quality flag Q and sets 1 for a pixel number flag S, before the operation proceeds to step S2.

One of the values 1 through 5 is set for the image quality flag Q in correspondence to the image recording quality 1 through 5 explained earlier. "NORMAL" is selected as the initial image recording quality setting. One of values 1 through 3 is set for the pixel number flag S in correspondence to the recording pixel number 1 through 3 explained earlier. "L-size" is selected as the initial recording pixel number setting.

In step S2, the arithmetic operation circuit 101 makes a decision as to whether or not an operation signal has been input from the image recording setting switch 112. The arithmetic operation circuit 101 makes an affirmative decision in step S2 if an operation signal has been input from the image recording setting switch 112 to proceed to step S3, whereas it makes a negative decision in step S2 if no operation signal has been input to proceed to step S4.

In step S3, the arithmetic operation circuit 101 executes setting and display processing before the operation proceeds to step S4. The setting and display processing is to be detailed later. In step S4, the arithmetic operation circuit 101 performs a photometering operation to calculate the subject brightness level by using a detection signal input from the photometering device 114, and then the operation proceeds to step S5. In step S5, the arithmetic operation circuit 101 executes specific exposure calculation processing before the operation proceeds to step S6.

In step S6, the arithmetic operation circuit 101 outputs a command for the controller 107 to access the memory card 106, and then the operation proceeds to step S7. In step S7, the arithmetic operation circuit 101 makes a decision as to whether or not the memory card 106 has been loaded into the camera. If the controller 107 having accessed the memory card 106 as described above detects the presence of the memory card 106 in the camera, the arithmetic operation circuit 101 makes an affirmative decision in step S7 to proceed to step S8, whereas if the presence of the memory card 106 is not detected, the arithmetic operation circuit 101 makes a negative decision in step S7 to proceed to step S15.

In step S8, the arithmetic operation circuit 101 calculates the number of frames of images that can be recorded into the available (remaining) area, i.e., the number of remaining frames N, based upon the recording capacity corresponding to the available area at the memory card 106 detected by the controller 107 and the number of recording pixels and the image recording quality set at the electronic camera, and then the operation proceeds to step S9. The number of remaining frames N is determined by dividing the remaining capacity by the required image recording capacity per image. The number of remaining frames N changes if either the number of recording pixels or the image recording quality is changed.

Figure 4:
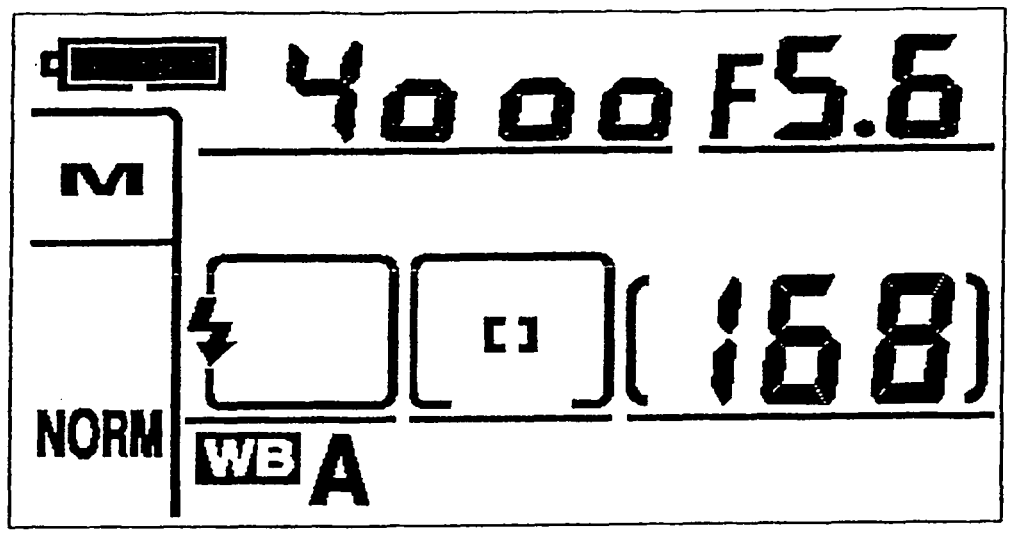
FIG. 4 presents an example of a display that may be brought up after the frame number display processing.
Figure 5:
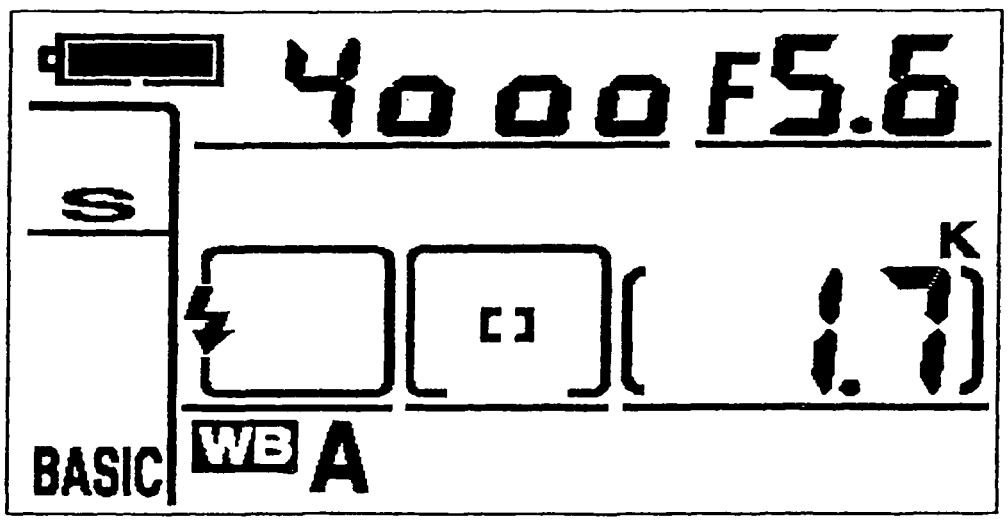
FIG. 5 presents an example of a display that may be brought up after the frame number display processing.

In step S9, the arithmetic operation circuit 101 outputs a command for the display drive circuit 116 to bring up a display of photographing information such as the shutter speed and the aperture value, the image recording quality and the number of recording pixels at the display device 12, and then the operation proceeds to step S9A. In step S9A, the arithmetic operation circuit 101 executes frame number display processing before the operation proceeds to step S10. FIGS. 4 and 5 present examples of displays that may be brought up at the display device 12 after the frame number display processing. In FIG. 4, "M-size" and "NORMAL" are selected respectively for the number of recording pixels and the image recording quality. "168" displayed in the numerical value segment 27 indicates the number of remaining frames N corresponding to the selected image recording quality setting in FIG. 4. "S-size" and "BASIC" are selected respectively for the number of recording pixels and the image recording quality in FIG. 5. The display "1.7 K" indicating the number of remaining frames N corresponding to the selected image recording quality setting in FIG. 5 is achieved with the numerical value segment 27, the K display segment 25 and the decimal point display segment 26. "1.7 K" indicates that the number of remaining frames N is within a range of 1700=<N<1800. It is to be noted that the frame number display processing is to be explained in detail later.

In step S10, the arithmetic operation circuit 101 makes a decision as to whether or not a release operation signal has been input from the shutter release switch 113. The arithmetic operation circuit 101 makes an affirmative decision in step S10 if a release operation signal has been input to proceed to step S11, whereas it makes a negative decision in step S10 if no release operation signal has been input to return to step S2.

In step S11, the arithmetic operation circuit 101 engages the drive circuit 103 to start drive of the image-capturing element 102 and also outputs a command for the photographing sequence control device 115 to implement exposure control including aperture control (not shown) and shutter control (not shown), before the operation proceeds to step S12. In response, the image-capturing element 102 stores electrical charges over a predetermined length of time in correspondence to the intensity of the subject light entering its image-capturing surface. In step S12, the arithmetic operation circuit 101 outputs a command for the drive circuit 103 to read out the image-capturing signals from pixels, the number of which corresponds to the value indicated at the flag S, from the image-capturing element 102, and then the operation proceeds to step S13.

In step S13, the arithmetic operation circuit 101 issues an instruction for the image-capturing signal processing circuit 104 to execute the image signal processing and then the operation proceeds to step S14. It is to be noted that if Q=1 (the image recording quality is "RAW"), the operation proceeds to step S14 by skipping step S13. In step S14, the arithmetic operation circuit 101 issues an instruction for the image-capturing signal processing circuit 104 to execute the compression processing at the compression rate corresponding to the value set at the flag Q and also issues an instruction for the recording circuit 105 to record the image data having undergone the compression processing into the memory card 106. It is to be noted that if Q=1 (the image recording quality is "RAW") or Q=2 (the image recording quality is "TIFF"), the image data are recorded uncompressed and, accordingly, the compression processing is skipped.

Once the image data are recorded into the memory card 106, the arithmetic operation circuit 101 returns to step S2 and ends the sequence of photographing processing. Since the processing shown in FIG. 3 is repeatedly executed when the photographing processing ends, the display indicating the number of remaining frames N is updated each time a frame is recorded.

Figure 6:
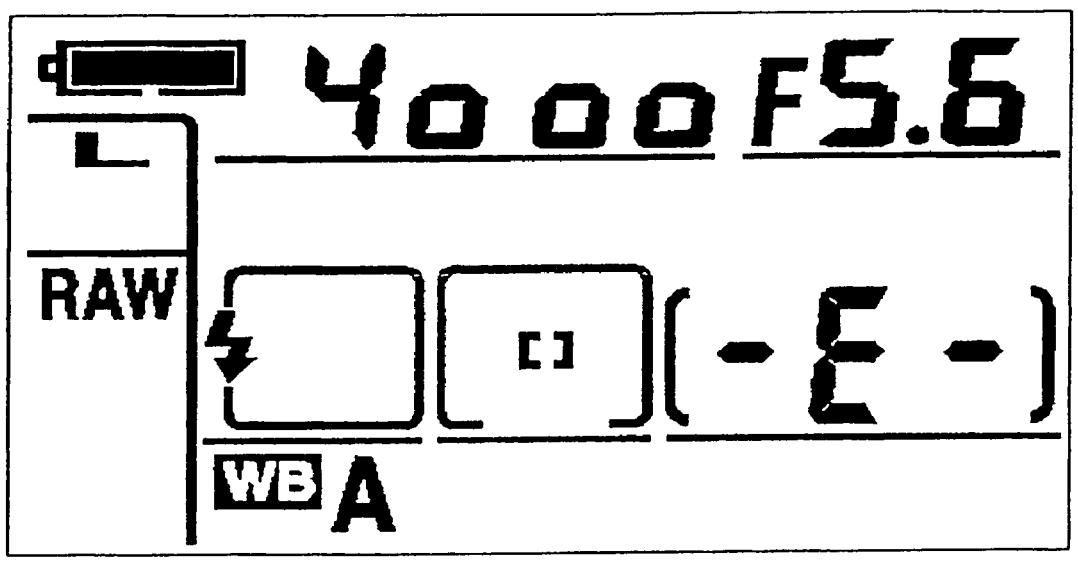
FIG. 6 presents an example of a display that may be brought up after the frame number display processing.

In step S15, to which the operation proceeds after making a negative decision in step S7, as described above, the arithmetic operation circuit 101 outputs a command for the display drive circuit 116 to bring up a display of the photographing information such as the shutter speed and the aperture value, the image recording quality and the number of recording pixels at the display device 12 before the operation proceeds to step S15A. In step S15A, the arithmetic operation circuit 101 executes the frame number display processing before the operation proceeds to step S16. FIG. 6 presents an example of a display that may be brought up at the display device 12 after the frame number display processing. FIG. 6 shows that "L-size" and "RAW" are selected respectively for the number of recording pixels and the image recording quality. In addition, "-E-" indicating that the memory card 106 has not been loaded into the camera is displayed in the numerical value segment 27 in FIG. 6. It is to be noted that the frame number display processing is to be explained in detail later.

In step S16, the arithmetic operation circuit 101 makes a decision as to whether or not a release operation signal has been input from the shutter release switch 113. The arithmetic operation circuit 101 makes an affirmative decision in step S16 if a release operation signal has been input to proceed to step S17, whereas it makes a negative decision in step S16 if no release operation signal has been input to return to step S2.

In step S17, the arithmetic operation circuit 101 engages the drive circuit 103 to start drive, of the image-capturing element 102 and also outputs a command for the photographing sequence control device 115 to implement exposure control including aperture control (not shown) and shutter control (not shown). When the exposure control is completed, the arithmetic operation circuit 101 returns to step S2 to end the sequence of photographing processing. If no memory card 106 is loaded, the image data are not recorded.

Figure 7:
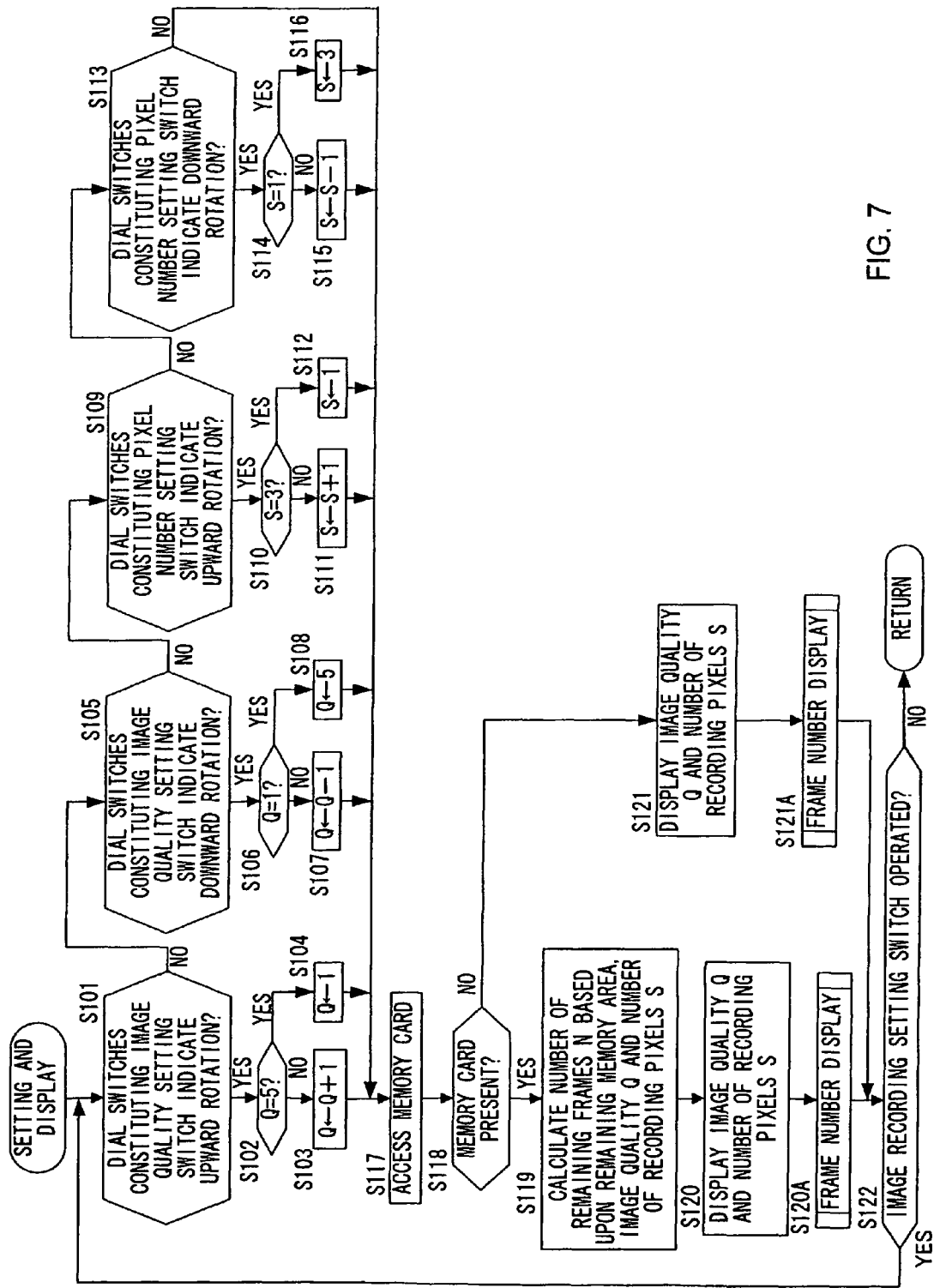
FIG. 7 presents a detailed flowchart of the setting and display processing.

The setting and display processing is now explained in detail in reference to the flowchart presented in FIG. 7. In step S101, the arithmetic operation circuit 101 makes a decision as to whether or not operation signals indicating an upward rotation have been input from the dial switches 108 and 109 constituting the image quality setting switch 13. The upward rotation may be, for instance, a clockwise rotation. The arithmetic operation circuit 101 makes an affirmative decision in step S101 if operation signals indicating an upward rotation have been input to proceed to step S102, whereas it makes a negative decision in step S101 if no operation signal indicating an upward rotation has been input to proceed to step S105.

In step S102, the arithmetic operation circuit 101 makes a decision as to whether or not the flag Q is set to 5. The arithmetic operation circuit 101 makes an affirmative decision in step S102 if Q=5 (the image recording quality is set to "BASIC") to proceed to step S104, whereas it makes a negative decision in step S102 if Q not=5 to proceed to step S103.

In step S103, the arithmetic operation circuit 101 adds 1 to the value of Q before the operation proceeds to step S117. In step S104, the arithmetic operation circuit 101 sets Q to 1 and then the operation proceeds to step S117. Since 1 is set for Q following 5 when an upward rotation is indicated, the value of Q is cyclically set.

In step S105, the arithmetic operation circuit 101 makes a decision as to whether or not operation signals indicating a downward rotation have been input from the dial switches 108 and 109 constituting the image quality setting switch 13. The downward rotation may be, for instance, a counterclockwise rotation. The arithmetic operation circuit 101 makes an affirmative decision in step S105 if operation signals indicating a downward rotation have been input to proceed to step S106, whereas it makes a negative decision in step S105 if no operation signal indicating a downward rotation has been input to proceed to step S109.

In step S106, the arithmetic operation circuit 101 makes a decision as to whether or not the flag Q is set to 1. The arithmetic operation circuit 101 makes an affirmative decision in step S106 if Q=1 (the image recording quality is set to "RAW") to proceed to step S108, whereas it makes a negative decision in step S106 if Q not 1 to proceed to step S107. In step S107, the arithmetic operation circuit 101 subtracts 1 from the value of Q before the operation proceeds to step S117. In step S108, the arithmetic operation circuit 101 sets Q to 5 and then the operation proceeds to step S117. Since 5 is set for Q following 1 when a downward rotation is indicated, the value of Q is cyclically set.

In step S109, the arithmetic operation circuit 101 makes a decision as to whether or not operation signals indicating an upward rotation have been input from the dial switches 110 and 111 constituting the pixel number setting switch 14. The upward rotation may be, for instance, a clockwise rotation. The arithmetic operation circuit 101 makes an affirmative decision in step S109 if operation signals indicating an upward rotation have been input to proceed to step S110, whereas it makes a negative decision in step S109 if no operation signal indicating an upward rotation has been input to proceed to step S113.

In step S110, the arithmetic operation circuit 101 makes a decision as to whether or not the flag S is set to 3. The arithmetic operation circuit 101 makes an affirmative decision in step S110 if S=3 (the number of recording pixels is set to "L-size") to proceed to step S112, whereas it makes a negative decision in step S110 if S not=3 to proceed to step S111. In step S111, the arithmetic operation circuit 101 adds 1 to the value of S before the operation proceeds to step S117. In step S112, the arithmetic operation circuit 101 sets S to 1 and then the operation proceeds to step S117. Since 1 is set for S following 3 when an upward rotation is indicated, the value of S is cyclically set.

In step S113, the arithmetic operation circuit 101 makes a decision as to whether or not operation signals indicating a downward rotation have been input from the dial switches 110 and 111 constituting the pixel number setting switch 14. The downward rotation may be, for instance, a counterclockwise rotation. The arithmetic operation circuit 101 makes an affirmative decision in step S113 if operation signals indicating a downward rotation have been input to proceed to step S114, whereas it makes a negative decision in step S113 if no operation signal indicating a downward rotation has been input to proceed to step S117.

In step S114, the arithmetic operation circuit 101 makes a decision as to whether or not the flag S is set to 1. The arithmetic operation circuit 101 makes an affirmative decision in step S114 if S=1 (the number of recording pixels is set to "S-size") to proceed to step S116, whereas it makes a negative decision in step S114 if S not=1 to proceed to step S115. In step S115, the arithmetic operation circuit 101 subtracts 1 from the value of S before the operation proceeds to step S117. In step S116, the arithmetic operation circuit 101 sets 5 to 3 and then the operation proceeds to step S117. Since 3 is set for S following 1 when a downward rotation is indicated, the value of S is cyclically set.

In step S117, the arithmetic operation circuit 101 outputs a command for the controller 107 to access the memory card 106, and then the operation proceeds to step S118. In step S118, the arithmetic operation circuit 101 makes a decision as to whether or not the memory card 106 has been loaded into the camera. If the controller 107 having accessed the memory card 106 as described above detects the presence of the memory card 106 in the camera, the arithmetic operation circuit 101 makes an affirmative decision in step S118 to proceed to step S119, whereas if the presence of the memory card 106 is not detected, the arithmetic operation circuit 101 makes a negative decision in step S118 to proceed to step S121.

In step S119, the arithmetic operation circuit 101 calculates the number of remaining frames N of images that can be recorded into the available (remaining) area based upon the recording capacity corresponding to the available area at the memory card 106 detected by the controller 107 and the number of recording pixels and the image recording quality set at the electronic camera, and then the operation proceeds to step S120.

Figure 8:
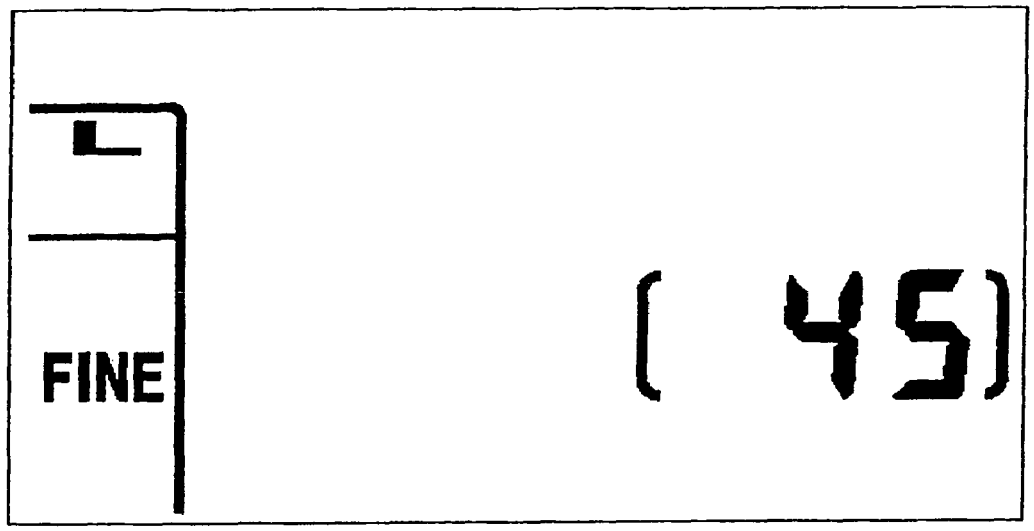
FIG. 8 presents an example of a display that may be brought up after the frame number display processing.
Figure 9:
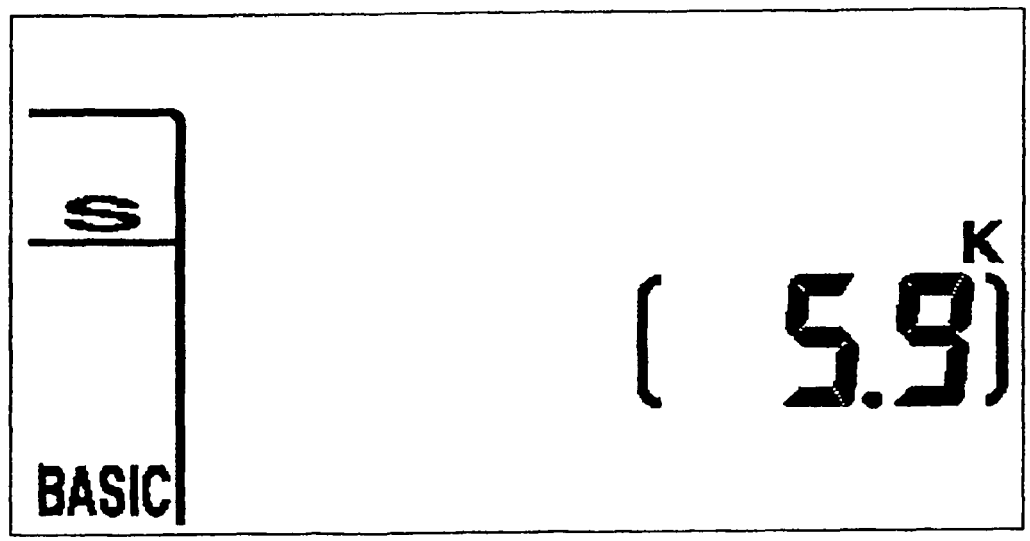
FIG. 9 presents an example of a display that may be brought up after the frame number display processing.

In step S120, the arithmetic operation circuit 1010 outputs a command for the display drive circuit 116 to bring up a display of the image recording quality and the number of recording pixels at the display device 12, and then the operation proceeds to step S120A. In step S120A, the arithmetic operation circuit 101 executes frame number display processing before the operation proceeds to step S122. FIGS. 8 and 9 present examples of displays that may be brought up at the display device 12 after the frame number display processing. In FIG. 8, "L-size" and "FINE" are selected respectively for the number of recording pixels and the image recording quality. "45" displayed in the numerical value segment 27 indicates the number of remaining frames N corresponding to the selected image recording quality setting in FIG. 4. "S-size" and "BASIC" are selected respectively for the number of recording pixel and the image recording quality in FIG. 9. The display "5.9 K" indicating the number of remaining frames N of images that can be recorded and corresponds to the selected image recording quality setting in FIG. 5 is achieved with the numerical value segment 27, the K display segment 25 and the decimal point display segment 26. "5.9 K" indicates that the number of remaining frames N is within a range of 5900=<N<6000. It is to be noted that the frame number display processing is to be explained in detail later.

In step S122, the arithmetic operation circuit 101 makes a decision as to whether or not an operation signal has been input from the image recording setting switch 112. The arithmetic operation circuit 101 makes an affirmative decision in step S122 if an operation signal has been input from the image recording setting switch 112 to return to step S101, whereas it makes a negative decision in step S122 if no operation signal has been input to end the processing shown in FIG. 7 and proceed to step S4 in FIG. 3.

Figure 10:
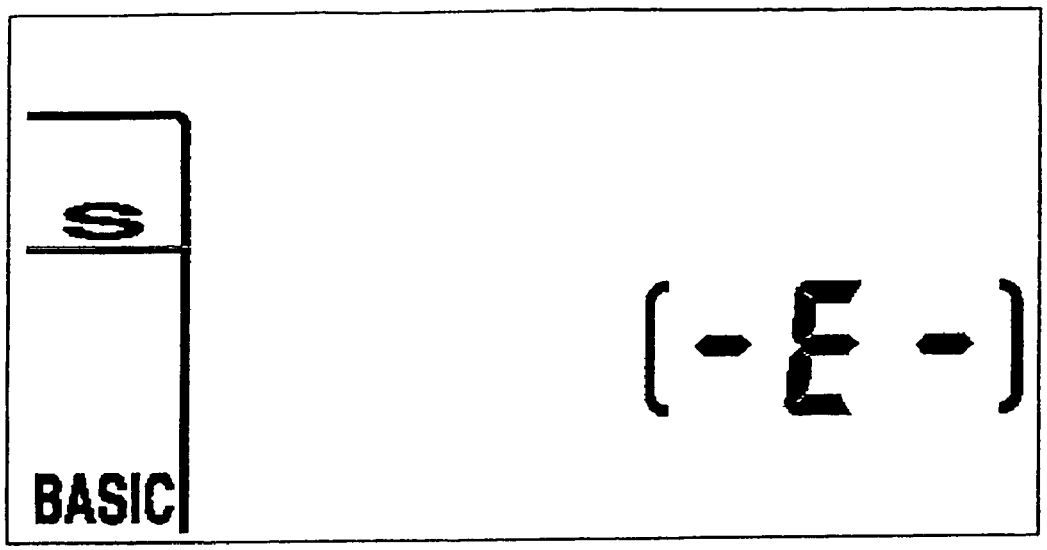
FIG. 10 presents an example of a display that may be brought up after the frame number display processing.

In step S121, to which the operation proceeds after making a negative decision in step S118, as described above, the arithmetic operation circuit 101 outputs a command for the display drive circuit 116 to bring up a display of the image recording quality and the number of recording pixels at the display device 12 before the operation proceeds to step S121A. In step S121A, the arithmetic operation circuit 101 executes frame number display processing before the operation proceeds to step S122. FIG. 10 presents an example of a display that may be brought up at the display device 12 after the frame number display processing. FIG. 10 shows that "S-size" and "BASIC" are selected respectively for the number of recording pixels and the image recording quality. In addition, "-E-" indicating that the memory card 106 has not been loaded into the camera is displayed in the numerical value segment 27 in FIG. 10. It is to be noted that the frame number display processing is to be explained in detail later.

In FIGS. 8 through 10, the display segments other than the pixel number segment 21 used to indicate the number of recording pixels, the image quality segment 22 used to indicate the image recording quality and the numerical value segment 27 used to indicate the number of remaining frames N or to indicate that the memory card 106 is not present in the camera remain off. However, the K display segment 25 and the decimal point display segment 26 are turned on as necessary to indicate the number of remaining frames N. Since the setting and display processing in FIG. 7 is executed to adjust the setting for the number of recording pixels or the image recording quality, the pixel number segment 21 and the image quality segment 22 corresponding to the setting elements (the number of recording pixels and the image recording quality in the example) undergoing the adjustment and the segments 25 through 27 used to indicate the numerical value (the number of remaining frames N which is changed as a result of adjusting either of the setting element) affected by the adjustment of the setting elements are used, while the other segments which are not used during this processing remain off. The segments which are not used and thus are set in an OFF state during the setting and display processing are reset to the ON state when the processing in FIG. 7 ends. FIGS. 4 through 6 present examples of displays that may be brought up at the display device 12 after the segments having been in an OFF state during the setting and display processing are reset to the ON state.

Figure 11:
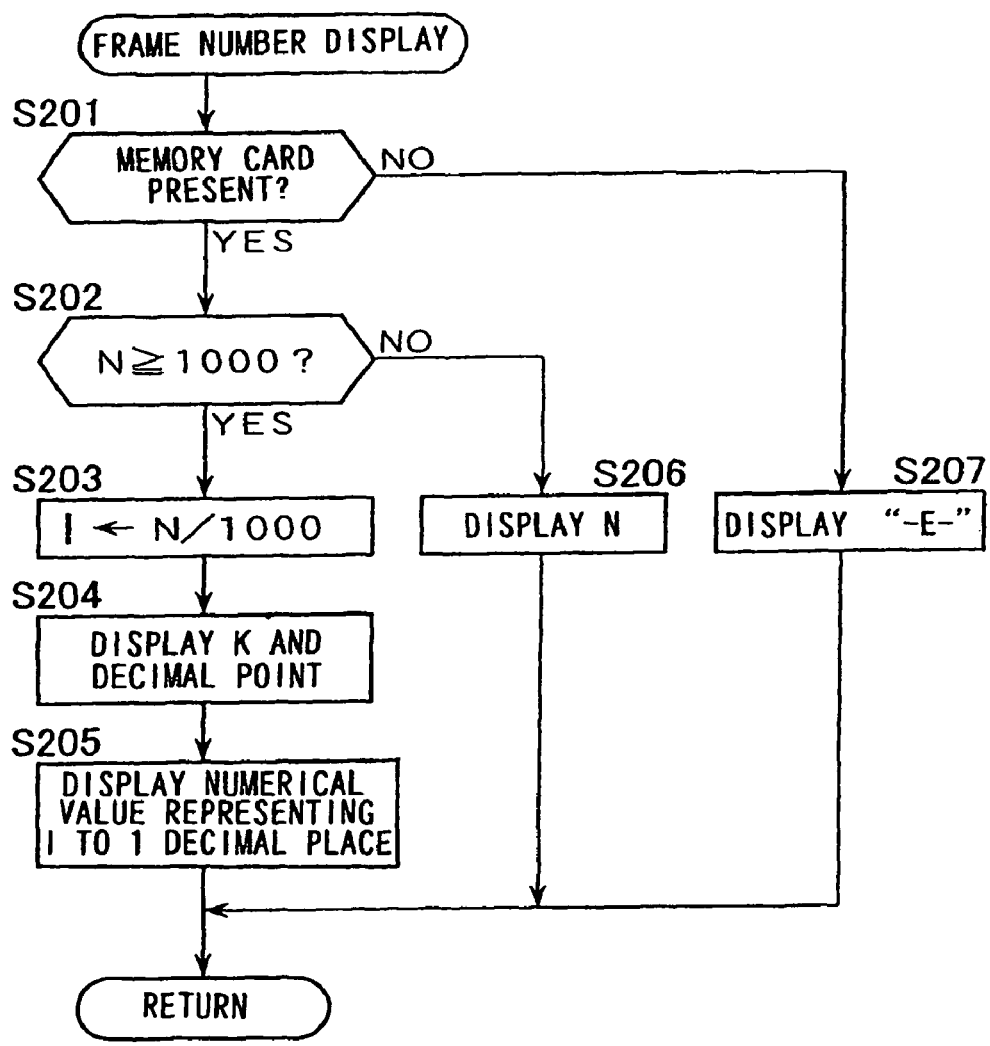
FIG. 11 presents a detailed flowchart of the frame number display processing.

The frame number display processing is now explained in detail in reference to the flowchart presented in FIG. 11. In step S201, the arithmetic operation circuit 101 makes a decision as to whether or not the memory card 106 is present in the camera. The arithmetic operation circuit 101 makes an affirmative decision in step S201 if the controller 107 having accessed the memory card 106, as described earlier, detects the presence of the memory card 106 in the camera, to proceed to step S202, whereas it makes a negative decision in step S201 if the memory card 106 is not detected to proceed to step S207.

In step S202, the arithmetic operation circuit 101 makes a decision as to whether or not the number of remaining frames N is equal to or greater than 1000. The arithmetic operation circuit 101 makes an affirmative decision in step S202 if N>=1000 is true to proceed to step S203, whereas it makes a negative decision in step S202 if N>=1000 is not true to proceed to step S206. In step S203, the arithmetic operation circuit 101 performs a calculation expressed as I=N/1000 before the operation proceeds to step S204. In step S204, the arithmetic operation circuit 101 outputs a command for the display drive circuit 116 to turn on "K" indicating 1000 in the K display segment 25 of the display device 12 and turn on "." indicating the decimal point in the decimal point display segment 26 of the display device 12, and then the operation proceeds to step S205.

In step S205, the arithmetic operation circuit 101 outputs a command for the display drive circuit 116 to turn on a display of the value of I to one decimal place in the numerical value segment 27 of the display device 12 before the subroutine processing shown in FIG. 11 ends. FIGS. 5 and 9 present examples of displays each indicating a numerical value that includes the tenths place digit, the decimal point and the thousands indicator character. It is to be noted that the value of I that is displayed in the numerical value segment 27 at the display device 12 in step S205 may be obtained by rounding off the numeral in the hundredths place to the nearest tenth to display the value to tenths place.

In step S206, the arithmetic operation circuit 101 outputs a command for the display drive circuit 116 to turn on the display of the value of N in the numerical value segment 27 of the display device 12 before the subroutine processing in FIG. 11 ends. FIGS. 4 and 8 present examples of displays, each indicating a value N within a range of 0=<N=<999. In step S207, the arithmetic operation circuit 101 outputs a command for the display drive circuit 116 to turn on "-E-" in the numerical value segment 27 of the display device 12, before the subroutine processing in FIG. 11 ends. FIGS. 6 and 10 present examples of displays that include "-E-".

The following advantages are achieved in the electronic camera in the embodiment described above.

(1) If the number of remaining frames N of images that can be recorded into the memory card 106 loaded in the camera is large and the number of digits in the value N exceeds the number of display digits (three digits in the example) at the numerical value segment 27 of the display device 12, the K display segment 25 and the decimal point display segment 26 are turned on and used as auxiliary display segments and the value N/1000 calculated to 1 decimal place is displayed at the 27. If no auxiliary display segments are used, "999" is invariably brought up on the display for values exceeding 999 regardless of the actual number of remaining frames, for example 1000 or 5000. Therefore, and the user will be unable to ascertain the actual value. In contrast, by using auxiliary display segments as in the embodiment, the display in segment 27 switches in units of 100 frames at a time for values calculated for the number of remaining frames which are equal to or greater than 1000, and thus, the user is able to ascertain the number of remaining frames N with ease. In addition, the number of display digits in the numerical value segment 27 does not need to be increased to 4 or more, the size of the display device 12 can remain compact and the display in the numerical value segment 27 does not become reduced and illegible due to an increase in the number of display digits.

(2) The display brought up at the display device 12 during a setting operation executed to adjust the setting of a setting element (the number of recording pixels or the image recording quality in the example) is achieved by using the pixel number segment 21 used to indicate the number of recording pixels which may be being adjusted, the image quality segment 22 to indicate the image recording quality which may be being adjusted and the numerical value segment 27 and the auxiliary display segments 25 and 26 used to indicate the number of remaining frames N which changes as a result of the adjustment of either setting element, while the other segments that are not used remain off. Since no display not relevant to the adjustment of the setting is turned on, a display which is less confusing and allows the photographer to check the setting adjustment with greater ease compared to a display having all the display segments including irrelevant display segments turned on can be achieved. Furthermore, the display of the number of remaining frames N allows the photographer to adjust the number of recording pixels or the image recording quality by checking the number of remaining frames N, and thus, an improvement in operability is achieved.

In the explanation given above, the K display segment 25 and the decimal point display segment 26 are used as auxiliary display segments of the 3-digit numerical value segment 27. However, the K display segment 25 may be omitted and the decimal point display segment 26 alone may be used as an auxiliary display segment. Since the number of remaining frames N changes by one frame at a time as a picture is taken, it is not necessary to display a decimal value if the number of remaining frames N is less than 1000. The display of a decimal place number becomes necessary only when the number of remaining frames N is equal to or greater than 1000. Accordingly, a display of a decimal value achieved by engaging the numerical value segment 27 and the decimal point display segment 26 indicates to the photographer that the number of remaining frames N is equal to or greater than 1000. The photographer needs to multiply the displayed value by 1000 only in case that the decimal value is displayed.

While an explanation is given above on an example in which the present invention is adopted in an electronic camera, the present invention may be adopted in electronic devices other than electronic cameras. For instance, it may be adopted to display the number of sets of data that can be recorded into a specific recording area of a data storage device. The number of display digits in the numerical value segment used to display the number of sets of data in this case does not need to be three and the unit indicated in the character display segment does not need to be 1000. These are elements that can be adjusted in conformance to the number of digits in numerical values to be displayed.

In the explanation given above, the number of frames of images that can be recorded into the available area of the memory card 106, i.e., the number of remaining frames N of images that can be photographed, is displayed. Instead, the number of recorded frames of images that have already been photographed and recorded or a value achieved by adding 1 to the number of recorded frames (which indicates the frame number assigned to the frame of an image to be recorded in the next photographing operation) may be brought up on display. It is to be noted that the number of frames is expressed as an integer, and more specifically, as a natural number such as 1, 2, 3, .... The number of frames can be also expressed as a negative natural number by using an auxiliary display segment used to display a minus sign.

In the explanation given above, the alphabet letter "K" (the lowercase k may be used) is used to indicate thousands. The term "thousands" means that the actual numerical value can be determined by multiplying the value on the display by 1000. In other words, the term "thousands place" indicates three digits. For instance, the alphabet letter "K" in "1 K" represents three digits with the numeral "1" being the fourth digit located to the left of the three digits represented by K. When the alphabet a letter "K" is used in combination with the decimal point, the alphabet letter "K" indicates three digits and the first numeral before the decimal point indicates the fourth digit in the number. In this embodiment, the three digits in a value which does not include the decimal point are 000 through 999. The three digits in a value that contains the decimal point are determined by taking into consideration the numeral following the decimal point. For instance, the three digits represented by the alphabet letter "K" in "1.7 K" are 700 through 799. It is to be noted that the symbol that may be used to indicate thousands is not limited to the alphabet letter "K". Another mark may be used to represent thousands by adopting a different specific rule.

While the term "circuit" is used in the explanation given above, as in the arithmetic operation circuit 101 and the drive circuit 103, the term "circuit" may be replaced with a term "device". For instance, the arithmetic operation circuit 101 and the drive circuit 103 may be instead referred to as the arithmetic operation device 101 and the drive device 103 respectively.

In the explanation given above, the display brought up at the display device 12 during a setting operation executed to adjust the setting of a setting element (the number of recording pixels or the image recording quality in the example) is achieved by using the pixel number segment 21 used to indicate the number of recording pixels which may be being adjusted, the image quality segment 22 used to indicate the image recording quality which may be being adjusted and the numerical value segment 27 and the auxiliary display segments 25 and 26 used to indicate the number of remaining frames N which changes as a result of the adjustment of either setting element, while the other segments that are not used remain off. However, the segments other than the segments 21, 22 and 25 through 27 do not all need to remain off. Basically, segments around the segments 21, 22 and 25 through 27 should stay in an OFF state so that the setting being adjusted can be displayed clearly.

The above described embodiment is an example, and various modifications can be made without departing from the spirit and scope of the invention.

What is claimed is:

1. An image data processing device comprising:
   a display element that displays a numeral representing predetermined information;
   an auxiliary display element that displays a single mark representing the predetermined information of a predetermined number of digits;
   a decision making device that decides whether or not numerical value information representing the predetermined information is equal to or greater than the predetermined number of digits;
   an arithmetic operation device that executes an arithmetic operation for the numerical value information by using the predetermined number of digits to obtain a result of the arithmetic operation if the decision making device decides that the numerical value information is equal to or greater than the predetermined number of digits; and
   a display control device that implements control so as to, if the numerical value information is smaller than the predetermined number of digits, without the arithmetic operation executed by the arithmetic operation device, display the predetermined information by indication on only the display element and no indication on the auxiliary display element, and so as to, if the numerical value information is equal to or greater than the predetermined number of digits, with the arithmetic operation executed by the arithmetic operation device, display the predetermined information by displaying the result of the arithmetic operation by combining indications on the display element and the auxiliary display element.

2. An image data processing device according to claim 1, further comprising:
   an operating member, wherein:
   the arithmetic operation device executes an arithmetic operation to obtain an integer which changes by 1 in response to an operation of the operating member.

3. An image data processing device according to claim 1, wherein:
   the auxiliary display element displays an alphabet letter K to indicate thousands.

4. An image data processing device according to claim 1, further comprising:
a decimal point auxiliary display element that displays a decimal point.

5. An image data processing device according to claim 1, wherein:
the auxiliary display element displays a decimal point; and
a display of the decimal point is equivalent to a display of a mark indicating the predetermined number of digits.

6. An image data processing device according to claim 1, wherein:
when the integer has more digits than a number of display digits in the display element, the display control device employs the auxiliary display element.

7. An image data processing device according to claim 6, wherein:
the auxiliary display element displays information related to the number of display digits in the display element.

8. An image data processing device according to claim 1, wherein:
the display element displays a 3-digit numerical value;
the auxiliary display element displays a mark indicating thousands; and
the display control device displays the integer by using the display element alone when a number of digits in the integer does not exceed three and displays the integer by using the display element and the auxiliary display element when the number of digits in the integer is equal to or greater than four.

9. An image data processing device according to claim 8, further comprising:
a decimal point auxiliary display element that displays a decimal point, wherein:
the display control device displays the integer by using the display element, the auxiliary display element and the decimal point auxiliary display element when the number of digits in the integer is equal to or greater than four.

10. An image data processing device according to claim 1, wherein:
the arithmetic operation device executes an arithmetic operation to obtain an integer which is affected as a setting element set when the image data processing device is changed.

11. An image data processing device according to claim 1, wherein:
the result of the arithmetic operation includes a decimal fraction.

12. An image data processing device comprising:
a display device that includes a display element displaying a numeral representing a number of remaining frames and an auxiliary display element displaying a mark representing the number of remaining frames of a predetermined number of digits;
a setting change operation member operated to change a recording image quality and a number of pixels of a recorded image; and
a display control device that controls the display device so as to simultaneously display at display positions different from each other: (i) the recording image quality and the number of pixels of a recorded image changed through an operation of the setting change operation member, and (ii) the number of remaining frames represented either by a first style that uses only an indication on the display element or by a second style that combines indications on the display element and the auxiliary display element, and affected by a change of one of the recording image quality and the number of pixels of the recorded image, one of the first style and the second style being selected based upon the change.

13. An image data processing device according to claim 12, wherein:
the display control device displays the setting elements and the numerical value on the same display device.

14. An image data processing device according to claim 12, wherein:
the display control device controls a display state of the auxiliary display element based on the numerical value varied by the change of one of the recording image quality and the number of pixels of the recorded image.

15. An image data processing device according to claim 12, wherein:
the display control device implements control so as to display setting elements including the recording image quality and the number of pixels of the recorded image, and to display the numerical value when the recording image quality and the number of pixels of the recorded image are not changed, and keeps displaying only the recording image quality, the number of pixels of the recorded image and the numerical value, when one of the recording image quality and the number of pixels of the recorded image is changed.

16. An electronic camera comprising:
a numeral display element that displays a numeral representing predetermined information;
an auxiliary display element that displays a mark representing the predetermined information of a predetermined numeral;
a decision making device that decides whether or not the numeral representing the predetermined information is equal to or greater than the predetermined number of digits;
an arithmetic operation device that executes an arithmetic operation for a number of remaining frames by using the predetermined numeral if the decision making device decides that the numerical value information is equal to or greater than the predetermined numeral; and
a display control device that implements control so as to, if the number of remaining frames is smaller than the predetermined number of digits, without the arithmetic operation executed by the arithmetic operation device, display a representation of the number itself of remaining frames by indication on only the numeral display element and no indication on the auxiliary display element, and so as to, if the number of remaining frames is equal to or greater than the predetermined number of digits, with the arithmetic operation executed by the arithmetic operation device, display the representation of the number itself of remaining frames by combining indications on the numeral display element and the auxiliary display element.

17. An electronic camera according to claim 16, wherein:
a 3-digit numerical value can be displayed at the numeral display element;
a mark indicating thousands is displayed at the auxiliary display element; and
the display control device implements control so as to display the number of remaining frames by using the numeral display element alone when the number of remaining frames is equal to or smaller than 999 and to display the number of remaining frames by using both the numeral display element and the auxiliary display element when the number of remaining frames is equal to or greater than 1000.

18. An electronic camera according to claim 16, further comprising:
a setting element display element that displays information related to a setting for at least either a number of recording pixels or an image recording quality; and
a setting element change device that changes the setting for at least either the number of recording pixels or the image recording quality, wherein:
the arithmetic operation device recalculates through the arithmetic operation the number of remaining frames based upon the setting for at least either the number of recording pixels or the image recording quality having been changed by the setting element change device; and
the display control device implements control so as to display the recalculated number of remaining frames by using the numeral display element and the auxiliary display element and display the information related to the setting for at least either the number of recording pixels or the image recording quality having been changed by the setting element change device by using the setting element display element.

19. An electronic camera according to claim 18, wherein:
the display control device implements control so as to substantially turn off display at display elements other than the numeral display element, the auxiliary display element and the setting element display element in a display device during change processing executed by the setting element change device.

20. An image data processing device, comprising:
a first display element that displays a numeral;
a second display element that displays a single mark representing a predetermined number of digits;
an arithmetic operation device that executes an arithmetic operation for numerical value information by using the predetermined number of digits if the numerical value information is equal to or greater than the predetermined number of digits; and
a display control device that controls the first and second display elements so as to display one representation of numerical value information by using only the first display element without using the second display element when the arithmetic operation device executes no arithmetic operation, and by simultaneously using the first and second display elements when the arithmetic operation device executes the arithmetic operation; wherein
the image data processing device is an electronic camera that records a shooting image on a recording medium,
the first display element displays a three-digits numerical display,
the second display element displays a mark showing a unit of 1,000 and
the display control device displays a number of remaining frames of the recording medium by using only the first element when the number of remaining frames that can be recorded on the recording medium is equal to or smaller than 999, and the number of remaining frames is displayed by using the first and second display elements when the number of remaining frames is equal to or greater than 1,000.

21. An image data processing device, wherein the image data processing device is an electronic camera that records a captured image on a recording medium, comprising:
a display device that can display numerical value information in a plurality of display forms different from each other, one display form of the plurality of the display forms including a display form that displays the numerical value information by using a single mark indicating a predetermined number of digits; and
a display control device that selects a display form of one of the plurality of display forms according to the number of digits of the numerical value information and displays the numerical value information in the selected display form, wherein:
the display device includes a first display element that displays three digits of a numeral display and a second display element that displays a mark showing a unit of 1,000, and
the display control device displays the number of remaining frames of the recording medium by using only the first display element when the number of remaining frames that can be recorded on the recording medium is equal to or smaller than 999, and the number of remaining frames is displayed by using the first and second display elements when the number of remaining frames is equal to or greater than 1,000.

22. An image data processing device according to claim 21, wherein:
the display control device controls the display device so as to simultaneously display a numeral and the single mark at display positions different from each other.

23. An image data processing device according to claim 21, further comprising:
an arithmetic operation device that performs an arithmetic operation that displays the numerical value information on the display device if the number of digits of the numerical value information is equal to or greater than a predetermined number of digits, wherein
the display control device displays the numerical value information by using the mark based on the arithmetic result of the arithmetic operation device.

24. An image data processing device, comprising:
a display device that displays numerical value information representing predetermined information;
a decision making device that decides whether or not the numerical value information representing the predetermined information is equal to or greater than a predetermined number of digits; and
an arithmetic operation device that simplifies the numerical value information by executing an arithmetic operation for the numerical value information by using the predetermined number of digits if the decision making device decides that a number of digits of the numerical value information is equal to or greater than the predetermined number of digits, and displays the simplified numerical value information on the display device, the simplified numerical value information including a display form that displays the numerical value information by using a single mark indicating the predetermined number of digits, wherein:
the display device simplifies no numerical value information and displays the numerical value information by using no single mark on the display device if the decision making device decides that the number of digits of the numerical value information is smaller than the predetermined number of digits.

25. An image data processing device according to claim 24, wherein:
the display device simultaneously displays a numeral and the single mark at display positions different from each other.

26. An image data processing device according to claim 24, wherein the image data processing device is an electronic camera that records a shooting image on a recording medium, wherein the display device includes a first display element that displays three digits of a numeral display and a second display element that displays a mark showing a unit of 1,000, and the arithmetic operation device performs an arithmetic operation that displays the number of remaining frames of the recording medium by using the first and second display elements when the number of remaining frames that can be recorded on the recording medium is equal to or greater than 1,000.

27. An image data processing device, comprising:

a display device that includes a display element displaying a numeral and an auxiliary display element displaying a mark representing a predetermined number of digits; and a display control device that simultaneously executes a display showing a recording image quality and a number of pixels of a recorded image, and a display showing a numerical value that is represented either by a first style that uses only an indication on the display element or by a second style that combines indications on the display element and the auxiliary display element and is affected by a change of one of the recording image quality and the number of pixels of the recorded image at display positions different from each other in a state when a change of one of the recording image quality and the number of pixels of the recorded image currently set is allowed, one of the first style and the second style being selected based upon the change; wherein the display control device implements control so as to display setting elements including the recording image quality and the number of pixels of the recorded image, and to display the numerical value when the recording image quality and the number of pixels of the recorded image are not changed, and keeps displaying only the recording image quality, the number of pixels of the recorded image and the numerical value, when a change of one of the recording image quality and the number of pixels of the recorded image is allowed.

28. An image data processing device according to claim 27, wherein:

the display control device displays the setting element and the numerical value on the same display device.

* * * * *